United States Patent
Kim et al.

(10) Patent No.: US 8,429,414 B2
(45) Date of Patent: Apr. 23, 2013

(54) APPARATUS AND METHOD OF GENERATING AND DETECTING PREVENTION AND CONTROL DATA FOR VERIFYING VALIDITY OF DATA

(75) Inventors: Dae-youb Kim, Seoul (KR); Weon-il Jin, Suwon-si (KR); Sung-ioon Park, Seoul (KR); Hwan-ioon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1714 days.

(21) Appl. No.: 11/260,245

(22) Filed: Oct. 28, 2005

(65) Prior Publication Data

US 2006/0137024 A1   Jun. 22, 2006

(30) Foreign Application Priority Data

Oct. 29, 2004 (KR) .................. 10-2004-0087238

(51) Int. Cl.
*H04L 9/32* (2006.01)
*H04L 29/06* (2006.01)

(52) U.S. Cl.
USPC ......... 713/181; 713/161; 713/165; 713/170; 713/171; 726/2; 726/26; 726/30; 380/277; 380/278

(58) Field of Classification Search .......... 713/181
See application file for complete search history.

(56) References Cited

U.S. PATENT DOCUMENTS

| | | | | |
|---|---|---|---|---|
| 6,032,137 A * | 2/2000 | Ballard | ........................ | 705/75 |
| 6,389,016 B1 * | 5/2002 | Sabaa et al. | ................... | 370/389 |
| 6,675,211 B1 * | 1/2004 | Mamaghani et al. | ......... | 709/224 |
| 6,690,428 B1 * | 2/2004 | Hudelson et al. | ............. | 348/461 |
| 7,218,407 B1 * | 5/2007 | Ihara | ........................... | 358/1.15 |
| 7,260,849 B1 * | 8/2007 | Frazier et al. | ................... | 726/28 |
| 7,620,383 B2 * | 11/2009 | Taglienti et al. | .............. | 455/406 |
| 2002/0078066 A1 * | 6/2002 | Robinson et al. | .......... | 707/104.1 |
| 2002/0141596 A1 * | 10/2002 | Hara | ............................... | 381/22 |
| 2002/0184622 A1 * | 12/2002 | Emura et al. | .................... | 725/34 |
| 2003/0001948 A1 * | 1/2003 | Mochizuki | ................. | 348/14.01 |
| 2003/0007676 A1 * | 1/2003 | Cato | ............................. | 382/137 |
| 2005/0105518 A1 * | 5/2005 | Hwang | ........................ | 370/373 |
| 2007/0136612 A1 * | 6/2007 | Asano et al. | .................. | 713/193 |
| 2007/0242675 A1 * | 10/2007 | Romrell et al. | ............ | 370/395.4 |
| 2008/0198855 A1 * | 8/2008 | Aramaki et al. | .............. | 370/394 |
| 2009/0080270 A1 * | 3/2009 | Choi | ........................ | 365/189.17 |

* cited by examiner

*Primary Examiner* — Edan Orgad
*Assistant Examiner* — Jenise Jackson
(74) *Attorney, Agent, or Firm* — Staas & Halsey LLP

(57) ABSTRACT

A method of generating prevention and control data to verify validity of data to be transmitted, and an apparatus to perform the method, the method including generating the prevention and control data according to composing information of the data to be transmitted, and transmitting the prevention and control data along with the data to be transmitted to verify the validity of the data to be transmitted.

20 Claims, 6 Drawing Sheets

APPARATUS AND METHOD OF GENERATING AND DETECTING PREVENTION AND CONTROL DATA FOR VERIFYING VALIDITY OF DATA

CROSS-REFERENCE TO RELATED APPLICATIONS

This application claims the benefit of Korean Patent Application No. 2004-87238, filed on Oct. 29, 2004 in the Korean Intellectual Property Office, the disclosure of which is incorporated herein by reference.

BACKGROUND OF THE INVENTION

1. Field of the Invention

The present invention relates to an apparatus and method of generating and detecting data; more particularly, to an apparatus and method of generating and detecting prevention and control data to verify validity of data.

2. Description of the Related Art

As applied in the conventional art, the term "control" generally refers to a designed policy, procedure, administrative work, or organization for providing logic confidence to archive objects of business, or to prevent, detect, and correct unexpected events. Meanwhile, such a control is generally classified as a preventive control, a detective control, and a corrective control in a data communication system.

The preventive control prevents problems before the problems actually occur. That is, the preventive control observes management and input, predicts potential problems before the problems occur, and prevents errors, omissions, and wrongful actions. The detective control detects the errors, omissions, and wrongful actions and reports the detected problems. The corrective control minimizes influences of intimidation from the problems by taking precautions against the problems detected by the detective control, and corrects a problem processing system to minimize future occurrences of identical problems by identifying causes of the problem and correcting errors. Until now, the data communication system has only used functions for detecting and correcting errors while transmitting and receiving data. However, the control function is not used for preventing and detecting problems by controlling data transmission in the data communication system.

FIG. 1 is a diagram illustrating a data transmitting/receiving system according to the conventional art.

Referring to FIG. 1, the conventional data transmitting/receiving system includes a transmitter 100 and a receiver 110. The transmitter 100 includes a data composing part 101, an encryption part 102, and a packaging part 103. That is, the data composing part 101 composes data to be transmitted, and the encryption part 102 encrypts the composed data. The packaging part 103 packages the encrypted data to a predetermined format of data, such as a packet formant, and adds signature data in the packaged data for data verification. The packaged data is transmitted to the receiver 110.

The receiver 110 includes an integrity check part 111, a depackaging part 112, and a decryption part 113. The integrity check part 111 receives the data transmitted from the transmitter 100 and performs an integrity check. The depackaging part 112 depackages the received data according to the method of packaging used in the packaging part 103 in the transmitter 100. The decryption part 113 decrypts the depackaged data according to the encoding method used in the encryption part 103 of the transmitter 100. Finally, the received data is recovered to original data.

Meanwhile, the integrity check guarantees that information is opened and corrected only by a permitted person in view of data and network security. For the integrity check, a physical environment of a terminal and a server connected to a network is controlled, access of data is limited, and strict verification steps are maintained. Data integrity may be threatened by environmental causes such as heat, dust, or surge current. In order to guarantee the data integrity in the view of network management, levels of permission assigned to all users are maintained, system management steps, limiting elements, and maintenance activities are documented, and a disaster recovery system is prepared for the surge current, malfunctioning of server, and/or virus attack.

A conventional integrity check includes a parity check scheme, a check digit scheme, and a hash value scheme. The parity check scheme verifies whether a sum of received data is identical to a sum of transmitted data or input data by inserting a parity bit into data to make the sum of data be an odd or even number. The check digit scheme adds a mathematically calculated value to data to verify whether the original data is modified, or original data is substituted for by a valid value. The hash value scheme adds a calculated value to data by using a hash function having a one-way characteristic to confirm whether the original data is modified.

The above mentioned conventional schemes are used to verify integrity of the data, but are not used to verify the validity of the data, which determines whether the contents of the data are actually reliable.

Hereinafter, cases requiring verification of data validity in data communication will be explained with reference to FIG. 2.

FIG. 2 is a diagram illustrating a billing system according to the conventional art.

Referring to FIG. 2, when a client 200 receives a predetermined service from a service provider 210, a billing system 220 bills provided service information to the client. For example, the service provider 210 allocates pay information {1, 2, 3, 4} to each program, and the allocated pay information is used in the billing system 220 to bill the client 200. When the client 200 request 5 programs, {1, 1, 2, 1, 3} for example, from the service provider 210, the service provider 210 encrypts the requested program information and transfers the encrypted program information to the client 200. The service provider 210 also transfers only the pay information {1, 1, 2, 1, 3} to the billing system 220. However, the service provider 210 or the billing system 220 cannot verify whether the transferred pay information correctly corresponds to the program information provided to the client 200. That is, there is no way to verify whether a client receives information such as {1, 1, 1, 1, 3} by mistake.

Therefore, there is great demand for a method to verify contents of data while maintaining secrecy of the data.

SUMMARY OF THE INVENTION

Accordingly, the present general inventive concept has been made to solve the above-mentioned and/or problems, and an aspect of the present general inventive concept is to provide an apparatus and method of generating prevention and control data to verify validity of data in order to verify a structure of contents in corresponding data while maintaining confidentiality of the data.

Additional aspects and/or advantages of the invention will be set forth in part in the description which follows and, in part, will be apparent from the description, or may be learned by practice of the invention.

In accordance with an aspect of the present invention, there is provided an apparatus to generate prevention and control data to verify validity of data, the apparatus including: a prevention and control data generating unit to generate composing information of data to be transmitted, and to compose the prevention and control data with verification data generated from the generated composing information; an encryption unit to encrypt the data to be transmitted; and a data transmitting unit to compose a transmitting data with the prevention and control data from the prevention and control data generating unit and the encrypted data from the encryption unit, and to transmit the transmitting data to a receiver.

The composing information may be type information of the data to be transmitted.

The prevention and control data may be composed by generating quantity information N(M) regarding a quantity of each of a number of types in the composing information based on the composing information being M={m[1], m[2], ..., m[n]}, wherein the quantity information N(M) is generated as: N(M)={n[1], n[2], ..., n[k]}, wherein n denotes a number of groups of data to be transmitted, k is a number of possible types in the composing information, and n[i] represents a quantity of the groups of data being of type i in the data to be transmitted.

The verification data S may be generated as:

$$S_0 = \sum_{i=1}^{n} (m[i])^0,$$

$$S_1 = \sum_{i=1}^{n} (m[i])^1,$$

$$S_2 = \sum_{i=1}^{n} (m[i])^2,$$

$$\vdots$$

$$S_{k-1} = \sum_{i=1}^{n} (m[i])^{k-1}.$$

The prevention and control data may be composed as:

Prevention and Control data={N(M),S={$s_0, s_1, \ldots, s_{n-1}$}}.

The transmitting data transmitted to the receiver may be composed as:

Transmitting data={D={$E_{key}(M),(N),N(M),S$},Sing(D)}, wherein $E_{key}$ denotes the data to be transmitted in encrypted form.

In accordance with another aspect of the present invention, there is provided a method of generating prevention and control data to verify validity of data, the method including: generating composing information of data to be transmitted; generating the prevention and control data based on the composing information; generating verification data by squaring values of the composing information; and composing the prevention and control data with the generated composing information and the verification data.

In accordance with another aspect of the present invention, there is provided an apparatus to verify prevention and control data to verify validity of data, the apparatus including: a data receiving unit to receive the prevention and control data, which is composed with composing information of data to be transmitted at a transmitter, and to receive transmitted verification data, generated based on the composing information, from the transmitter; and a validity check unit to verify the validity of received data by calculating verification data from the composing information of the received data and comparing the calculated verification data and the received verification data from the transmitter.

The verification data v may be calculated from the composing information by:

$$v_j = \sum_{i=0}^{k} (m_i \times n[i]^j).$$

In accordance with another aspect of the present invention, there is provided a method of verifying prevention and control data to verify a validity of a data, the method including: receiving the prevention and control data, which is composed with composing information of data to be transmitted, and transmitting verification data, generated based on the composing information, from a transmitter; calculating verification data from the composing information in the received data; and verifying the validity of the received data by comparing the calculated verification data and the received verification data.

In accordance with another aspect of the present invention, there is provided an apparatus to generate prevention and control data to verify validity of data to be transmitted, the apparatus including: a prevention and control data generating unit to generate the prevention and control data according to composing information of the data to be transmitted; wherein the prevention and control data is transmitted along with the data to be transmitted to verify the validity of the data to be transmitted.

The composing information may include a plurality of type values respectively identifying a type of each of a plurality of groups of data in the data to be transmitted.

The prevention and control data may indicate respective quantities of each of the possible type values included in the composing information.

The prevention and control data generating unit may also generate verification data to be transmitted along with the prevention and control data and the data to be transmitted.

The verification data may be generated by squaring the type value of each of the plurality of groups of data and summing results of the squaring.

In accordance with another aspect of the present invention, there is provided a method of generating prevention and control data to verify validity of data to be transmitted, the method including: generating the prevention and control data according to composing information of the data to be transmitted; and transmitting the prevention and control data along with the data to be transmitted to verify the validity of the data to be transmitted.

The present invention provides an apparatus and method to verify contents of data with maintaining secrecy of data. That is, a transmitting side to transmit data can verify validity of data generated by itself, and a receiving side can verify the validity of the data without decrypting encrypted data when the receiving side uses transmitted data as information such as billing information. In order to verify the validity of the data, the transmitting side generates and transmits prevention and control data including contents composing information of the data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
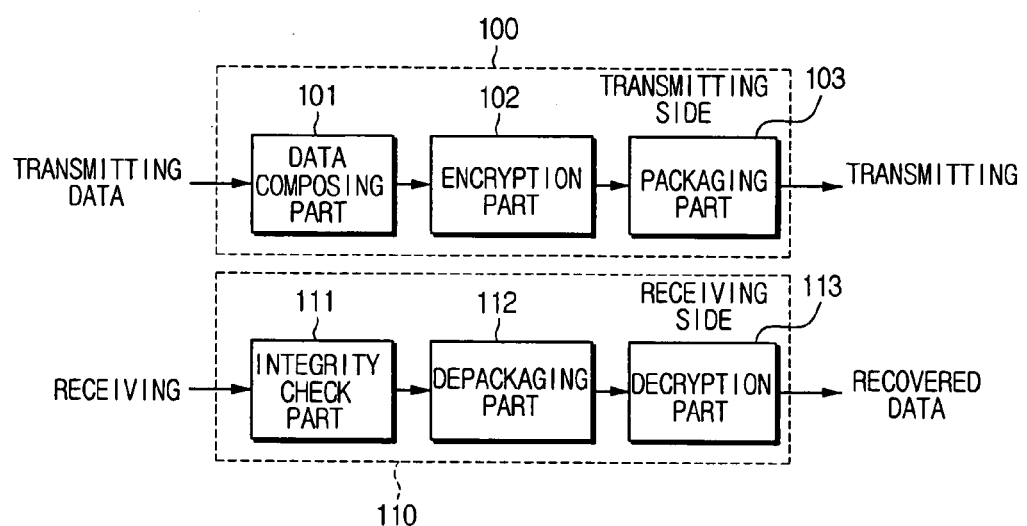
FIG. 1 is a diagram illustrating a data transmitting/receiving system according to a related art.
Figure 2:
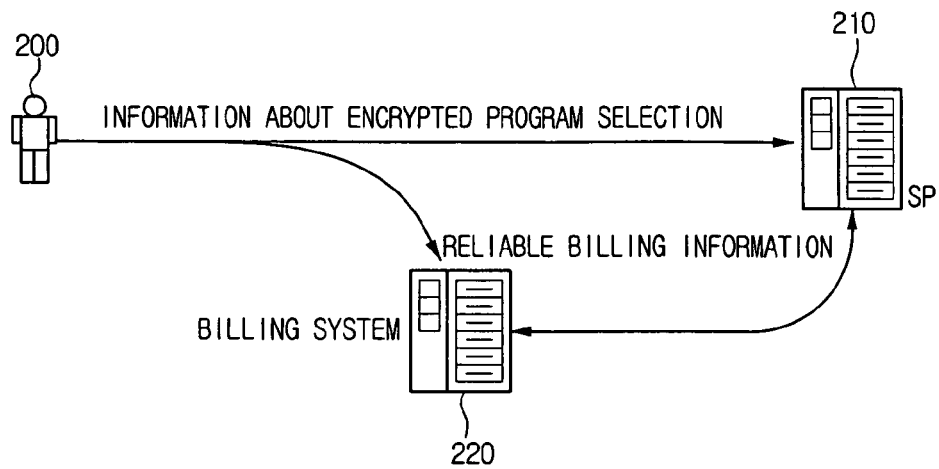
FIG. 2 is a diagram illustrating a billing system according to a related art.

Reference will now be made in detail to the embodiments of the present invention, examples of which are illustrated in the accompanying drawings, wherein like reference numerals refer to the like elements throughout. The embodiments are described below to explain the present invention by referring to the figures.

In the following description, drawing reference numerals may be repeated to describe repeated elements in different drawings. Some matters may be defined in the description along with a detailed construction, however, these elements are merely provided to assist in a comprehensive understanding of the invention. Thus, it is apparent that the present invention may be carried out without those particularly described elements. Also, well-known functions or constructions may not be described in detail, so as to not obscure the invention in unnecessary detail.

Figure 3:
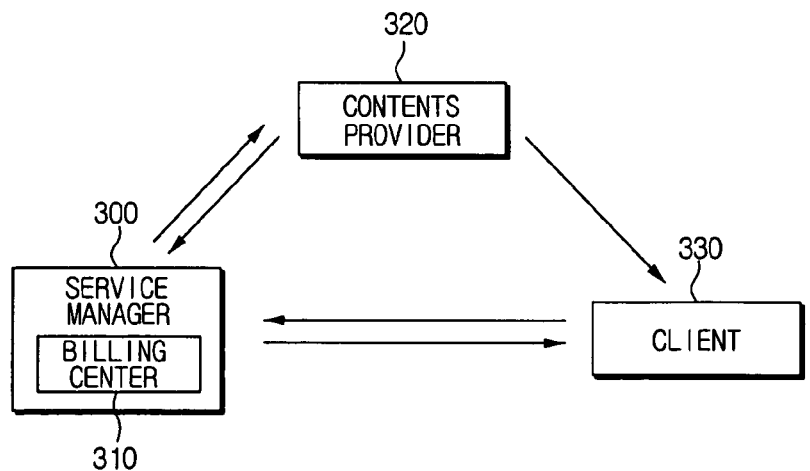
FIG. 3 is a diagram illustrating a validity verifying system according to an embodiment of the present invention.

FIG. 3 is a diagram illustrating a validity verifying system according to an embodiment of the present invention.

Referring to FIG. 3, a contents provider 320 provides information about predetermined pay programs to a client 330. A cost of provided programs is calculated in a billing center 310 managed by a service manager 300, and the calculated cost is billed to the corresponding client 330. That is, if the client requests information about pay programs from the service manager 300, the service manager 300 orders the contents provider 320 to provide the requested contents to the corresponding client 330. The requested contents may be directly provided from the contents provider 320 to the client 330, or provided through the service manager 300. Billing information of the requested contents is calculated by the billing center 310 according to the contents provided to the client 330. Although the billing center 310 is shown to be included in the service manager 300 in FIG. 3, it may be consigned to a separated organization.

In order to verify whether data provided to the client 330 is the data requested by the client 330, or to determine whether the contents provider 320 transmits the wrong data to the client 330 by mistake, a validity of the data must be verified according to the present embodiment. That is, when the contents provider 320 provides contents to the client 330, the contents provider 320 generates prevention and control data to verify the validity of corresponding contents. Accordingly, the service manager 300 can confirm whether the corresponding contents information is the information requested by the client 330 based on the prevention and control data. The prevention and control data can be also used for billing a cost of using the corresponding information.

For example, if the contents provider 320 allocates pay information {1, 2, 3, 4} to each program (or other such group of data) to be provided, the pay information is previously transmitted to the service manager 300 or the billing center 310. Under the above mentioned circumstance, if the client 330 requests 5 programs from the service manager 300, and the pay information of the requested programs is {1, 1, 2, 1, 3}, the contents provider 320 encrypts the requested programs, transmits the encrypted programs to the corresponding client 330, and transmits the pay information {1, 1, 2, 1, 3} to the service manger 300 or the billing center 310. According to this embodiment, the service manager 300 generates prevention and control data based on the pay information and the program data to be transmitted to verify whether the pay information is reliable and accurate.

Therefore, reliability of the pay information can be verified based on the prevention and control data generated according to the present embodiment without confirming the actual program data.

Figure 4:
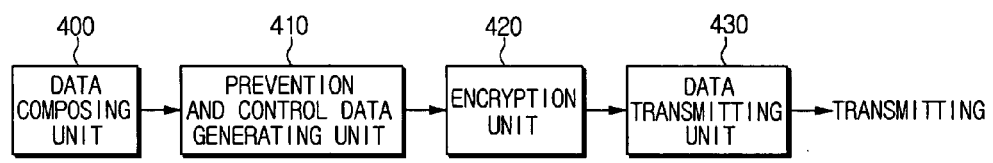
FIG. 4 is a diagram illustrating an apparatus to generate prevention and control data to verify validity of data according to an embodiment of the present invention.

FIG. 4 is a diagram illustrating an apparatus to generate prevention and control data to verify validity of data according to an embodiment of the present invention.

Referring to FIG. 4, the prevention and control data generating apparatus includes a data composing unit 400, a prevention and control data generating unit 410, an encryption unit 420, and a data transmitting unit 430. The conventional data transmitter 100 shown in FIG. 1 transmits data by encrypting and packaging the data. However, the apparatus according to this embodiment of the present invention includes the prevention and control data generating unit 410 to generate the prevention and control data to verify the validity of the data. Accordingly, the data transmitting unit 430 adds the prevention and control data generated by the prevention and control data generating unit 410 to the encrypted real data, and transmits the encrypted data with the prevention and control data to a receiving side. Therefore, the validity of the transmitted data is verified based on the prevention and control data generated by the prevention and control data generating unit 410. Generation of the prevention and control data will be explained in detail later in this detailed description.

Figure 5:
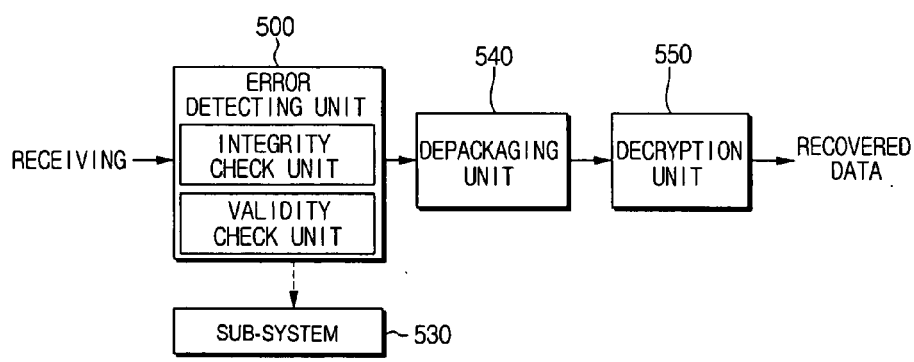
FIG. 5 is a diagram depicting an apparatus to verify prevention and control data to verify validity of data according to an embodiment of the present invention.

FIG. 5 is a diagram illustrating an apparatus to verify prevention and control data to verify validity of data according to an embodiment of the present invention.

Referring to FIG. 5, the apparatus to verify prevention and control data to verify validity of the data includes an error detecting unit 500 a depackaging unit 540, and a decryption unit 550. The error detecting unit 500 further includes an integrity check unit 510 and a validity check unit 520.

As previously discussed, the conventional data receiver 110 in FIG. 1 performs the integrity check only. However, the validity check unit 520 according to this embodiment of the present invention verifies the validity of corresponding data based on the prevention and control data. The error detecting unit 500 may perform the integrity check and the validity check simultaneously or separately, according to a method of performing the validity check and the integrity check.

Hereinafter, a method of generating the prevention and control data to verify the validity of data according to an embodiment of the present invention will be explained in detail. The present invention will be explained by describing various embodiments. However, it will be apparent to those skilled in the art that various changes and modifications may be made without departing from the spirit and scope of the invention.

First, a method of generating the prevention and control data will be explained.

If data to be transmitted is represented by a set A, the set A of the data can be expressed as below in Eq. 1.

$$A = \{m_j \in Z^+ | 1 \leq j \leq k\} \qquad \text{Eq. 1}$$

Referring to Eq. 1, the prevention and control data is data to verify reliability of a type or a class of data to be transmitted. If there are k types or k classes of data, the data should be a positive integer. For example, if the data to be transmitted is information about a lottery, a type of the data may be information about prize rankings, and if the data is information about pay services, a type of the data may be information about billing information. In the description of these embodiments, the data requested by and transmitted to the user is referred to as "groups" of data. These groups may refer to programs, data structures, files, or the like.

Meanwhile, if the client request n groups of data satisfying Eq. 1, type information M regarding the requested data can be expressed as below Eq. 2.

$$M = \{m[1], m[2], \ldots, m[n]\} \qquad \text{Eq. 2}$$

That is, n type information (or composing information) values may be generated to satisfy $1 \leq m[i] \leq k$ for n groups of data requested by the client.

If the type information of each group of data satisfies $1 \leq m[i] \leq k$, and n[j] groups of data having $m_j$ are in a set M, the type information (or composing information) of the n[j] groups of data can be expressed as below Eq. 3.

$$N(M) = \{n[1], n[2], \ldots, n[k]\} \qquad \text{Eq. 3}$$

For example, if four pay information values {1, 2, 3, 4} are allocated to each group of data, and pay information requested by a client is {1, 1, 2, 1, 3}, m[i] has one of values 1, 2, 3, and 4 because of k=4. If this is applied to Eq. 2, M={1, 1, 2, 1, 3}, and if it is applied to Eq. 3, N(M)={3, 1, 1, 0}, since the set M includes three 1s, one 2, one 3, and no 4. That is, N(M) represents the quantity of each type in the type information.

Accordingly, if N(M) is known, the validity of the value can be verified without the value of M being recognized.

Meanwhile, verification data is additionally generated by squaring each type information value to verify the type information in a receiving side.

The verification data to verify the type information can be calculated as below in Eq. 4 according to the this embodiment of the present invention.

$$S_0 = \sum_{i=1}^{n} (m[i])^0 \qquad \text{Eq. 4}$$

$$S_1 = \sum_{i=1}^{n} (m[i])^1$$

$$S_2 = \sum_{i=1}^{n} (m[i])^2$$

$$\vdots$$

$$S_{k-1} = \sum_{i=1}^{n} (m[i])^{k-1}$$

According to Equation 4, the verification data $S_0$ is obtained by raising data type information values m[0], m[1], m[2], . . . , m[n] to the $0^{th}$ power and summing the raised results. The verification data $S_1$ is the sum of the data type information values m[0], m[1], m[2], . . . , m[n]. The verification data $S_2$ is obtained by raising data type information values m[0], m[1], m[2], . . . , m[n] to the $2^{nd}$ power and summing the raised results, and the verification data $S_{k-1}$ is obtained by raising data type information values m[0], m[1], m[2], . . . , m[n] to the $k-1^{th}$ power and summing the raised results.

Meanwhile, the prevention and control data generated by the prevention and control data generating unit 410 can be expressed as below in Eq. 5, based on N(M) generated by Eq. 3 and S={$s_0, s_1, \ldots, s_{n-1}$} generated by Eq. 4

Prevention and Control data=
$$\{N(M), S = \{s_0, s_1, \ldots, s_{n-1}\}\} \qquad \text{Eq. 5}$$

Accordingly, the transmitting data transmitted from a data transmitting side may be composed with encrypted real data requested by the client and the prevention and control data. That is, the prevention and control data can be expressed as below in Eq. 6.

Transmitting data=$\{D = \{E_{key}(M), N(M), S\}, \text{Sign}(D)\} \qquad \text{Eq. 6}$ In Eq. 6, $E_{key}(M)$ denotes the encrypted real data requested by the client, and N(M) represents the type information calculated by Eq. 3. Also, S represents the prevention and control data generated by Eq. 5 and Sign(D) represents data D to which is added signature data. That is, the data transmitting unit 430 generates the transmitting data by composing the encrypted actual data with the N(M) and S, and transmits the generated transmitting data.

Therefore, a receiving side or a verifying side, e.g., a service manager or a billing center, can verify the validity of data based on the received N(M) and S without receiving the type information of each group of data shown in Eq. 2.

The method of generating the prevention and control data in a transmitting side transmitting the data according to this embodiment has been heretofore described. Hereinafter, a method of verifying the validity of data based on the generated prevention and control data will be explained.

When the prevention and control data generating unit 410 generates N(M) and S from M as described above, the generated prevention and control data, which is N(M) and S, is transmitted instead of transmitting the M.

Meanwhile, a receiving part already knows information A about a type or a class of transmitted data shown in Eq. 1, and verifies the validity of the transmitted data based on the received N(M) and S. That is, the method of verifying a validity of data according to this embodiment of the present invention verifies the validity of the transmitted data by calculating S based on the received N(M) and A, and determining whether the received S is identical to the calculated S.

At first, a multiplying value v is obtained as shown below in Eq. 7. That is, the multiplying value v is calculated by multiplying elements of A and elements of N(M) for all the type information values (j=0, 1, . . . , k−1).

$$v_j = \sum_{i=0}^{k} (m_i \times n[i]^j) \qquad \text{Eq. 7}$$

In Eq. 7, $m_i$ denotes elements of A, and n[i] represents elements of N(M).

As a second part of verification, if $v_j$ calculated from Eq. 7 is identical to the received S for all of the type information values (j=0, 1, ..., k−1), it determines that a composition of M composed during generation of prevention and control data is N(M). It is expressed following Eq. 8.

$$s_j = v_j (j=0,1,\ldots,k-1)$$

Meanwhile, it can be shown that the validity of the data can be verified by Eq. 7 and Eq. 8 by the following.

At first, it is assumed that there is a cyclic code matrix C as below in Eq. 9.

$$C = \begin{pmatrix} 1 & 1 & 1 & \cdots & 1 \\ a_1 & a_2 & a_3 & \cdots & a_n \\ a_1^2 & a_2^2 & a_3^2 & \cdots & a_n^2 \\ \cdots & \cdots & \cdots & \cdots & \cdots \\ a_1^{n-1} & a_2^{n-1} & a_3^{n-1} & \cdots & a_n^{n-1} \end{pmatrix} \qquad \text{Eq. 9}$$

In Eq. 9, if $a_i$ and $a_k$ are different for all indexes i and k, a determinant of the matrix C is not 0. Accordingly, a reverse matrix of the matrix C always exists.

Therefore, a validity and a uniqueness of data can be proved by using the above described characteristics.

At first, the validity of the data can be shown as below in Eq. 10.

$$n = \sum_{i=1}^{k} n[i] \qquad \text{Eq. 10}$$

$$\sum_{i=1}^{n} m[i] = \sum_{i=1}^{k} m_i \times n[i]$$

$$\sum_{i=1}^{n} m[i]^2 = \sum_{i=1}^{k} m_i^2 \times n[i]$$

$$\vdots$$

$$\sum_{i=1}^{n} m[i]^{k-1} = \sum_{i=1}^{k} m_i^{k-1} \times n[i]$$

That is, by referring to Eq. 10, a left side of Eq. 10 is a squaring value of M calculated by Eq. 4, that is, the left side denotes the value S. A right side of Eq. 10 represents v.

Secondly, the uniqueness of the data can be shown as below in Eq. 11.

$$\sum_{i=1}^{n} (n[i] - n'[i]) = 0 \qquad \text{Eq. 11}$$

$$\sum_{i=1}^{n} m_i \times (n[i] - n'[i]) = 0$$

$$\sum_{i=1}^{n} m_i^2 \times (n[i] - n'[i]) = 0$$

$$\vdots$$

$$\sum_{i=1}^{n} m_i^{k-1} \times (n[i] - n'[i]) = 0$$

In Eq. 11, n[i]=n'[i] for all values of i (i=1, 2, ..., n) must be satisfied.

Accordingly, it is mathematically proven that Eq. 7 and Eq. 8 verifies the validity of the data.

The method of generating the prevention and control data and verifying the validity of data according to this embodiment has been described heretofore. Hereinafter, a method of transmitting data, receiving data, and verifying the validity of data will be explained with reference to FIGS. 6 to 9.

Figure 6:
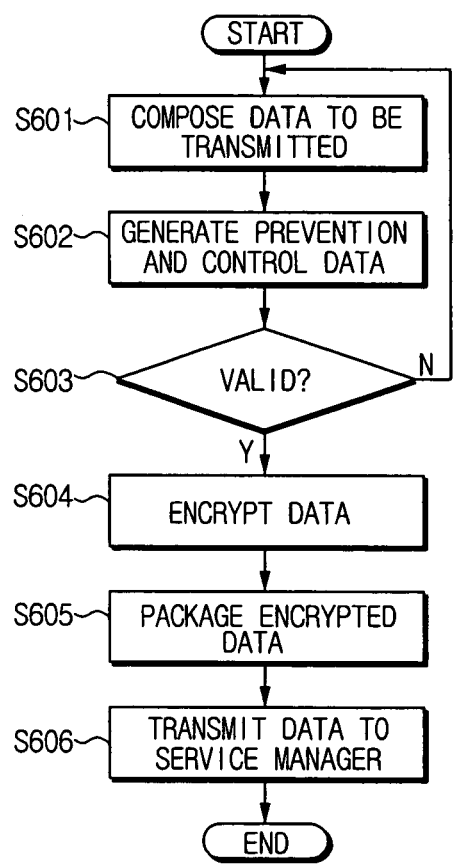
FIG. 6 is a flowchart illustrating a method of generating and transmitting prevention and control data to verify validity of data according to an embodiment of the present invention.

FIG. 6 is a flowchart illustrating a method of generating and transmitting prevention and control data to verify the validity of data according to an embodiment of the present invention.

Referring to FIG. 6, a contents provider, e.g., a transmitter, composes transmitting data at operation S601. After composing the transmitting data, prevention and control data is generated at operation S602 according to the above described method.

Meanwhile, the transmitter may verify the validity of the transmitting data based on the generated prevention and control data. Accordingly, the transmitting data is verified based on the generated prevention and control data at operation S603. If the transmitting data is not valid, the contents provider composes the transmitting data again.

If the composed transmitting data is valid, the transmitting data is encrypted at operation S604 and the encrypted data is packaged to a predetermined packet format at operation S605. After packaging, the packaged data is transmitted to a service manager or other receiver at operation S606.

Figure 7:
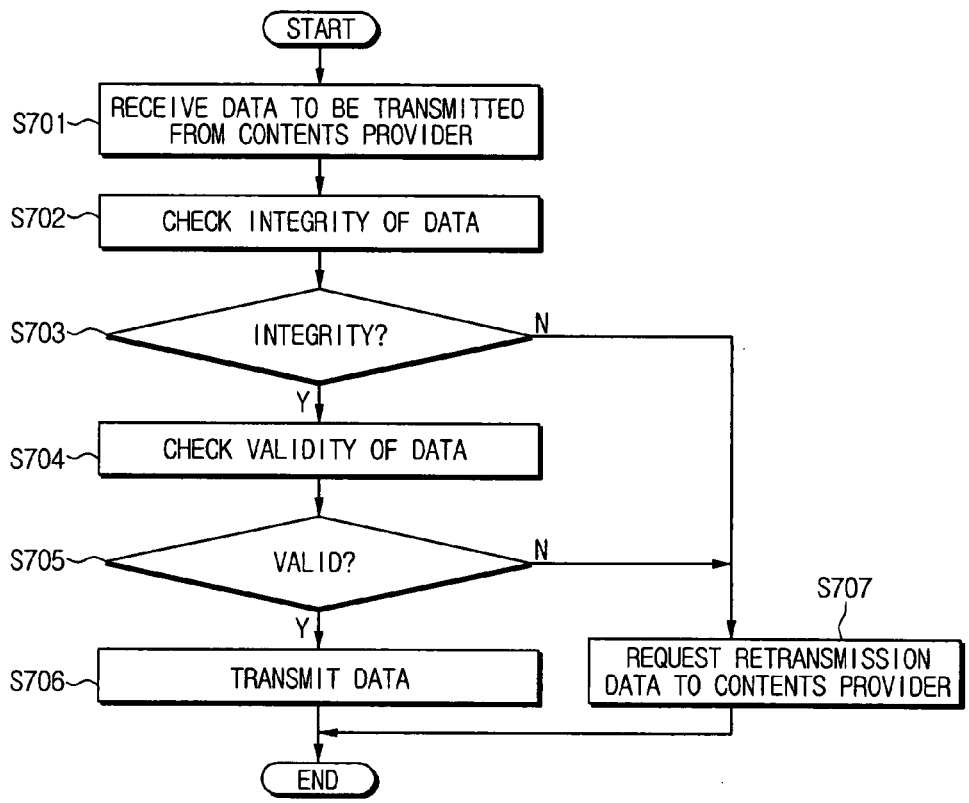
FIG. 7 is a flowchart illustrating a method of verifying validity of data based on prevention and control data according to an embodiment of the present invention.

FIG. 7 is a flowchart illustrating a method of verifying the validity of the data based on the prevention and control data according to an embodiment of the present invention.

Referring to FIG. 7, a receiver such as a client, service manager, or billing center where a validity data is verified receives the transmitting data including the prevention and control data at operation S701, and performs an integrity check of the received data at operation S702. If there are errors in the received data, the receiver request retransmission of the data from the contents provider at operation S707.

If the received data passes the integrity check at operation S703, a validity check of the received data is performed at operation S704. If there are errors in the type information of the received data as a result of the validity check, the receiver request retransmission of the data from the contents provider at operation S707. If the received data is valid at operation S705, the data is reproduced, or the received data is transferred to the billing center of the sub-system 530 at operation S706.

Figure 8:
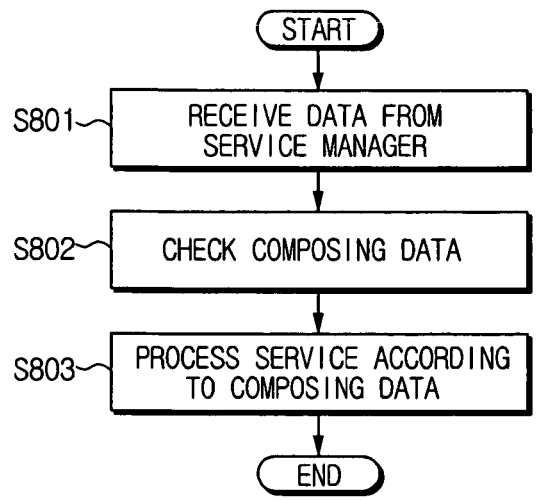
FIG. 8 is a flowchart illustrating a method of processing services from prevention and control data according to an embodiment of the present invention.

FIG. 8 is a flowchart illustrating a method of processing services from prevention and control data according to an embodiment of the present invention.

Referring to FIG. 8, when the validity of data transmitted to the client is verified, type information of the transmitting data from the transmitter is received at operation S801, and composition data of the received data is determined at operation S802. According to the composition data, service is processed at operation S803. For example, when the verification of the data validity is applied to billing, a validity of billing information is verified based on the prevention and control data, and if there is no error, the billing information is used to bill the client.

Figure 9:
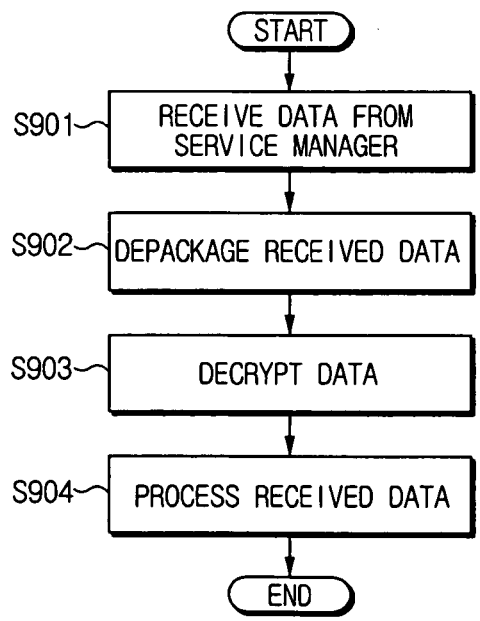
FIG. 9 is a flowchart illustrating a method of receiving prevention and control data according to an embodiment of the present invention.

FIG. 9 is a flowchart illustrating a method of receiving prevention and control data according to an embodiment of the present invention.

Referring to FIG. 9, the client receives data of which the validity is checked based on the method shown in FIG. 7 at operation S901. The received data is depackaged at operation S902, and the depackaged data is decrypted at operation S903. The received data is processed by reproducing or using the decrypted data at operation S904.

According to the methods described in relation to these embodiments of the present invention, a verifier cannot recognize details of data M, but can recognize type information about how many $m_i$s are included in the M to verify the validity of the type information of the transmitting data. That is, information where $m_i$ is located, and details of M, are hidden from the verifier.

The apparatus and method of generating prevention and control data and verifying the validity of data according to the present embodiments can be applied to various fields. The present embodiments may be used when control data is provided while maintaining confidentiality of selected fields. For example, the described embodiments may be applied when pay service is provided by selecting a program. That is, a classification number may be allocated to each program according to its cost, and a program manager calculates a cost of using the program by calculating a sum of costs allocated to the programs. In this case, the program manager cannot determine which program is requested from a client, but it is possible to calculate valid billing to the corresponding client.

For another example, the described embodiments may be used to respond to an opinion poll with a limited number of answers, or applied to answers of an electronic test (e-Test). According to the described embodiments, an answer of the application for the e-test or the opinion poll is not known, but its validity can be verified, or it can be determined to a certain number how many applications answer a predetermined question.

For still another example, the described embodiments may be effectively used for an Internet lottery ticket issuing system where an order of mixing data must be hidden from a purchaser, and data composed by the purchaser is mixed and transferred. If the number of persons in each ranking of the lottery is fixed, it can be verified, based on the type information of all lottery tickets issued, that lottery tickets assigned to each ranking have been normally issued, although distribution paths of all the lottery tickets are unrecognized.

As described above, in the conventional art, a reliability of transmitting data could not be verified because there was no method of verifying the validity of the transmitting data. However, according to the present invention, the reliability of the transmitting data can be verified based on type information and prevention and control data. For example, if an embodiment of the present invention is used in a billing system, composition of contents in the data can be verified and confirmed while maintaining a confidentiality of the transmitting data.

The foregoing aspects and advantages are merely exemplary and are not to be construed as limiting the present invention. The present teaching may be readily applied to other types of apparatuses. Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to generate prevention and control data to verify validity of data, the apparatus comprising:
 a prevention and control data generating unit to generate composing information of data to be transmitted, and to compose the prevention and control data with verification data generated from the generated composing information;
 an encryption unit to encrypt the data to be transmitted; and
 a data transmitting unit to compose transmitting data with the prevention and control data from the prevention and control data generating unit and the encrypted data from the encryption unit, and to transmit the transmitting data to a receiver,
 wherein the composing information is type information of the data to be transmitted and the type information of the data comprises quantity information regarding a quantity of each of a number of types of data, the composing information comprising a plurality of type values respectively identifying a type of each of a plurality of groups of data in the data to be transmitted and a number of groups of data to be transmitted,
 wherein the prevention and control data indicates respective quantities of each of the possible type values included in the composing information, and wherein the prevention and control data is composed by generating quantity information N(M) regarding a quantity of each of a number of types in the composing information based on the composing information being M={m[1], m[2], . . . , m[n]}, wherein the quantity information N(M) is generated as:

$$N(M)=\{n[1],n[2],\ldots,n[k]\},$$

wherein n denotes the number of groups of data to be transmitted, k is a number of possible types in the composing information, and n[i] represents a quantity of the groups of data being of type i in the data to be transmitted.

2. The apparatus of claim 1, wherein the verification data S is generated as:

$$S_0 = \sum_{i=1}^{n} (m[i])^0$$

$$S_1 = \sum_{i=1}^{n} (m[i])^1$$

$$S_2 = \sum_{i=1}^{n} (m[i])^2$$

$$\vdots$$

$$S_{k-1} = \sum_{i=1}^{n} (m[i])^{k-1}.$$

3. The apparatus of claim 2, wherein the prevention and control data is composed as:

Prevention and Control data=$\{N(M),S=\{s_0,s_1,\ldots,s_{n-1}\}\}$

4. The apparatus of claim 2, wherein the transmitting data transmitted to the receiver is composed as:

Transmitting data=$\{D=\{E_{key}(M),N(M),S\},\text{Sign}(D)\},$ wherein $E_{key}$ denotes the data to be transmitted in encrypted form.

5. A method of generating prevention and control data to verify validity of data, the method comprising:

generating composing information of data to be transmitted at a prevention and control data generating unit;

generating the prevention and control data based on the composing information at the prevention and control data generating unit of a contents provider;

generating verification data by squaring values of the composing information; and composing the prevention and control data with the generated composing information and the verification data, wherein the composing information is type information of the data to be transmitted from the contents provider to a client and the type information of the data comprises quantity information regarding a quantity of each of a number of types of data, the composing information comprising a plurality of type values respectively identifying a type of each of a plurality of groups of data in the data to be transmitted and, and wherein the prevention and control data indicates respective quantities of each of the possible type values included in the composing information.

6. The method of claim 5, wherein the prevention and control data is composed by generating quantity information N(M) regarding a quantity of each of a number of types in the composing information based on the composing information being M={m[1], m[2], . . . , m[n]}, wherein the quantity information N(M) is generated as:

N(M)={n[1],n[2], . . . ,n[k]}, wherein n denotes a number of groups of data to be transmitted, k is a number of possible types in the composing information, and n[i] represents a quantity of the groups of data being of type i in the data to be transmitted.

7. The method of claim 6, wherein the verification data S is generated as:

$$S_0 = \sum_{i=1}^{n} (m[i])^0$$

$$S_1 = \sum_{i=1}^{n} (m[i])^1$$

$$S_2 = \sum_{i=1}^{n} (m[i])^2$$

$$\vdots$$

$$S_{k-1} = \sum_{i=1}^{n} (m[i])^{k-1}.$$

8. The method of claim 7, wherein the prevention and control data is composed as:

Prevention and Control data={N(M),S={$s_0,s_1, \ldots ,s_{n-1}$}}.

9. The method of claim 5, further comprising encrypting the data to be transmitted, composing transmitting data with the prevention and control data and the encrypted data, and transmitting the transmitting data to a receiver.

10. The method of claim 9, wherein the transmitting data is composed as:

Transmitting data={D={$E_{key}$(M),N(M),S},Sign(D)}.

11. An apparatus to verify prevention and control data to verify validity of data, the apparatus comprising:

a data receiving unit to receive the prevention and control data, which is composed with composing information of data to be transmitted at a transmitter, and to receive transmitted verification data, generated based on the composing information, from the transmitter; and a validity check unit to verify the validity of received data by calculating verification data from the composing information of the received data and comparing the calculated verification data and the received verification data from the transmitter, wherein the composing information is type information of the data to be transmitted and the type information of the data comprises quantity information regarding a quantity of each of a number of types of data, the composing information comprising a plurality of type values respectively identifying a type of each of a plurality of groups of data in the data to be transmitted and a number of groups of data to be transmitted, wherein the prevention and control data indicates respective quantities of each of the possible type values included in the composing information, and wherein the prevention and control data is composed by generating quantity information N(M) regarding a quantity of each of a number of types in the composing information based on the composing information being M={m[1], m[2], . . . , m[n]}, wherein the quantity information N(M) is generated as:

N(M)={n[1],n[2], . . . ,n[k]}, wherein n denotes the number of groups of data to be transmitted, k is a number of possible types in the composing information, and n[i] represents a quantity of the groups of data being of type i in the data to be transmitted.

12. The apparatus of claim 11, wherein the verification data S is generated by:

$$S_0 = \sum_{i=1}^{n} (m[i])^0$$

$$S_1 = \sum_{i=1}^{n} (m[i])^1$$

$$S_2 = \sum_{i=1}^{n} (m[i])^2$$

$$\vdots$$

$$S_{k-1} = \sum_{i=1}^{n} (m[i])^{k-1}.$$

13. The apparatus of claim 12, wherein the prevention and control data is composed as:

Prevention and Control data={N(M),S={$s_0,s_1, \ldots ,s_{n-1}$}}.

14. The apparatus of claim 13, wherein the verification data v is calculated from the composing information by:

$$v_j = \sum_{i=0}^{k} (m_i \times n[i]^j).$$

15. A method of verifying prevention and control data to verify a validity of a data, the method comprising:

receiving the prevention and control data, which is composed with composing information of data to be transmitted, and transmitted verification data, generated based on the composing information, at a receiver, from a transmitter;

calculating verification data from the composing information in the received data; and verifying the validity of the received data by comparing the calculated verification data and the received verification data at an error detecting unit, wherein the composing information is type information of the data to be transmitted and the type information of the data comprises quantity information regarding a quantity of each of a number of types of data, the composing information comprising a plurality of type values respectively identifying a type of each of a plurality of groups of data in the data to be transmitted and a number of groups of data to be transmitted, wherein the prevention and control data indicates respective quantities of each of the possible type values included in the composing information, and wherein the prevention and control data is composed by generating quantity information N(M) regarding a quantity of each of a number of types in the composing information based on the composing information being M={m[1], m[2], . . . , m[n]}, wherein the quantity information N(M) is generated as:

$$N(M) = \{n[1], n[2], \ldots, n[k]\},$$

wherein n denotes the number of groups of data to be transmitted, k is a number of possible types in the composing information, and n[i] represents a quantity of the groups of data being of type i in the data to be transmitted.

16. The method of claim 15, wherein the verification data S is generated by:

$$S_0 = \sum_{i=1}^{n} (m[i])^0$$

$$S_1 = \sum_{i=1}^{n} (m[i])^1$$

$$S_2 = \sum_{i=1}^{n} (m[i])^2$$

$$\vdots$$

$$S_{k-1} = \sum_{i=1}^{n} (m[i])^{k-1}.$$

17. The method of claim 16, wherein the prevention and control data is composed as:

Prevention and Control data = $\{N(M), S = \{s_0, s_1, \ldots, s_{n-1}\}\}$.

18. The method of claim 17, wherein the verification data v calculated from the composing information is calculated by:

$$v_j = \sum_{i=0}^{k} (m_i \times n[i]^j).$$

19. An apparatus to generate prevention and control data to verify validity of data to be transmitted, the apparatus comprising:

a prevention and control data generating unit to generate the prevention and control data according to composing information of the data to be transmitted;

wherein the prevention and control data is transmitted along with the data to be transmitted to verify the validity of the data to be transmitted, and wherein the composing information is type information of the data to be transmitted and the type information of the data comprises quantity information regarding a quantity of each of a number of types of data, the composing information comprising a plurality of type values respectively identifying a type of each of a plurality of groups of data in the data to be transmitted and a number of groups of data to be transmitted, and wherein the prevention and control data indicates respective quantities of each of the possible type values included in the composing information, wherein the prevention and control data generating unit also generates verification data to be transmitted along with the prevention and control data and the data to be transmitted, and wherein the verification data is generated by squaring the type value of each of the plurality of groups of data and summing results of the squaring.

20. A method of generating prevention and control data to verify validity of data to be transmitted, the method comprising:

generating the prevention and control data according to composing information of the data to be transmitted at a prevention and control data generating unit;

transmitting the prevention and control data along with the data to be transmitted to verify the validity of the data to be transmitted from a transmitter of a contents provider to a client; and generating verification data to be transmitted along with the prevention and control data and the data to be transmitted, wherein the composing information is type information of the data to be transmitted from the contents provider to the client and the type information of the data comprises quantity information regarding a quantity of each of a number of types of data, the comprising information comprising a plurality of type values respectively identifying a type of each of a plurality of groups of data in the data to be transmitted and a number of groups of data to be transmitted, wherein the prevention and control data indicates respective quantities of each of the possible type values included in the composing information, and wherein the verification data is generated by squaring the type value of each of the plurality of groups of data and summing results of the squaring.

* * * * *

UNITED STATES PATENT AND TRADEMARK OFFICE
CERTIFICATE OF CORRECTION

PATENT NO. : 8,429,414 B2  
APPLICATION NO. : 11/260245  
DATED : April 23, 2013  
INVENTOR(S) : Dae-youb Kim et al.

Page 1 of 1

It is certified that error appears in the above-identified patent and that said Letters Patent is hereby corrected as shown below:

Title Page Col. 1, Item (75) (Inventors), Line 2, Delete "Sung-ioon" and insert -- Sung-joon --, therefor.

Title Page Col. 1, Item (75) (Inventors), Line 3, Delete "Hwan-ioon" and insert -- Hwan-joon --, therefor.

In the Claims:

Col. 12, Line 63, In Claim 3, delete ",$s_{n-1}$}}" and insert -- ,$s_{n-1}$}}. --, therefor.

Col. 13, Line 21, In Claim 5, delete "and, and" and insert -- , and --, therefor.

Signed and Sealed this  
Eighth Day of October, 2013

Teresa Stanek Rea  
*Deputy Director of the United States Patent and Trademark Office*